United States Patent

Kamei et al.

[11] Patent Number: 5,609,366
[45] Date of Patent: Mar. 11, 1997

[54] WHEEL SUSPENSION SYSTEM MOUNT ASSEMBLY

[75] Inventors: Takahiro Kamei; Yoshitaka Sekiguchi, both of Saitama-ken, Japan

[73] Assignee: Honda Giken Kogyo Kabushiki Kaisha, Tokyo, Japan

[21] Appl. No.: 533,778

[22] Filed: Sep. 26, 1995

[30] Foreign Application Priority Data

Oct. 5, 1994 [JP] Japan .................................. 6-266301

[51] Int. Cl.$^6$ ............................ B62D 7/22; B62D 21/00
[52] U.S. Cl. ............................................................ 280/788
[58] Field of Search ............................................. 280/788

[56] References Cited

U.S. PATENT DOCUMENTS

| 4,826,203 | 5/1989 | Kijima et al. | 280/788 |
| 5,374,081 | 12/1994 | Schoderer et al. | 280/788 |

FOREIGN PATENT DOCUMENTS 2-38221  3/1990  Japan .

*Primary Examiner*—Kenneth R. Rice
*Attorney, Agent, or Firm*—Armstrong, Westerman, Hattori, McLeland & Naughton

[57] ABSTRACT

Lower arms of a wheel suspension system are pivotably attached to brackets which are in turn attached to both the vehicle body and the subframe, whereby the subframe can provide a significantly high rigidity with respect to the lower arms of the wheel suspension system, and can effectively insulate the passenger compartment of the vehicle from the vibrations and noises which are otherwise transmitted from the wheel suspension system to the subframe. The rigidity of the brackets can be further enhanced when each of the brackets is provided with a closed cross section in a part thereof which extends between the bearing portion and the vehicle body. Additionally, if the brackets consist of upright leg sections of a lateral member extending across a pair of longitudinal members on either side of the subframe, the brackets can be made highly rigid not only to vertical loads but also to lateral loads. The lateral member and the brackets may be integrally formed substantially from a single metal sheet. Alternatively, the lateral member may extend between lower parts of the brackets or between the parts of the longitudinal members at which the lower ends of the brackets are attached.

8 Claims, 7 Drawing Sheets

WHEEL SUSPENSION SYSTEM MOUNT ASSEMBLY

CROSS REFERENCE TO RELATED APPLICATIONS

The following applications on subject matters similar to those of the present application were contemporaneously filed by the same inventors, and the contents of these copending applications are incorporated in the present application by reference.

U.S. patent application Ser. No. 08/533,779 filed Sep. 26, 1995 (Our Ref: F428) (based on Japanese patent application No. 6-259542 filed Sep. 29, 1994); and U.S. patent application Ser. No. 08/534,033 filed Sep. 26, 1995 (Our Ref: F429) (based on Japanese patent application No. 6-259541 filed Sep. 29, 1994).

TECHNICAL FIELD

The present invention relates to a wheel suspension system mount assembly wherein a wheel suspension system is mounted on a subframe which is in turn mounted on a vehicle body.

BACKGROUND OF THE INVENTION

It has been previously known to mount a subframe on a vehicle body via resilient bushes, and to pivotally attach the inner ends of the lower arms of a wheel suspension system to the subframe, for instance, as is disclosed in Japanese utility model application No. 02-38221. In such an arrangement for supporting a wheel suspension system, a pair of plate members, which extend laterally of the vehicle body, and spaced from each other, are attached to the lower surface or the side surface of the subframe to define a bearing portion, on each side of the vehicle body, and the inner end of the lower arms of the vehicle suspension systems are pivotally attached to the corresponding bearing portions via bushes.

However, the bearing portions, which extends from the subframe in the manner of cantilevers, tend to be low in rigidity so that the bearing portions are not effective in shutting off the noises and sounds transmitted from the road surface from the passenger compartment. It is conceivable to reinforce the bearing portions, but it will add weight to the subframe, and increase the effort and cost required to fabricate the subframe assembly.

BRIEF SUMMARY OF THE INVENTION

In view of such problems of the prior art, a primary object of the present invention is to provide a wheel suspension system mount assembly which is easy and economical to fabricate, but can still offer a high rigidity against loads applied from the wheel suspension system;

A second object of the present invention is to provide a wheel suspension system mount assembly which is light in weight and can still offer a high rigidity against loads applied from the wheel suspension system.

These and other objects of the present invention can be accomplished by providing a wheel suspension system mount assembly, comprising: a vehicle subframe which is attached to a vehicle body, and supports at least a part of a wheel suspension system; and a pair of brackets provided in the subframe for attaching the subframe to the vehicle body; each of the brackets being provided with a bearing portion for pivotably supporting an inner end of a lower arm of the wheel suspension system.

Because the brackets are attached to both the vehicle body and the subframe, they can offer a significantly high rigidity with respect to the lower arms of the wheel suspension system, and can effectively insulate the passenger compartment of the vehicle from the vibrations and noises which are otherwise transmitted from the wheel suspension system to the subframe.

The rigidity of the brackets can be further enhanced when each of the brackets is provided with a closed cross section in a part thereof which extends between the bearing portion and the vehicle body. Additionally, if the brackets consist of upright leg sections of a lateral member extending across a pair of longitudinal members on either side of the subframe, the brackets can be made highly rigid not only to vertical loads but also to lateral loads. The lateral member and the brackets may be integrally formed substantially from a single metal sheet. Alternatively, the lateral member may extend between lower parts of the brackets or between the parts of the longitudinal members at which the lower ends of the brackets are attached.

Preferably, each of the bearing potions is defined by a pair of mutually opposing planar sections of a lower part of the bracket, the planar sections extending substantially laterally with respect to the vehicle body in a mutually spaced apart relationship. To further reinforce this arrangement, edges of the planar sections facing away from the corresponding lower arm may be integrally joined together by a third planar section.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
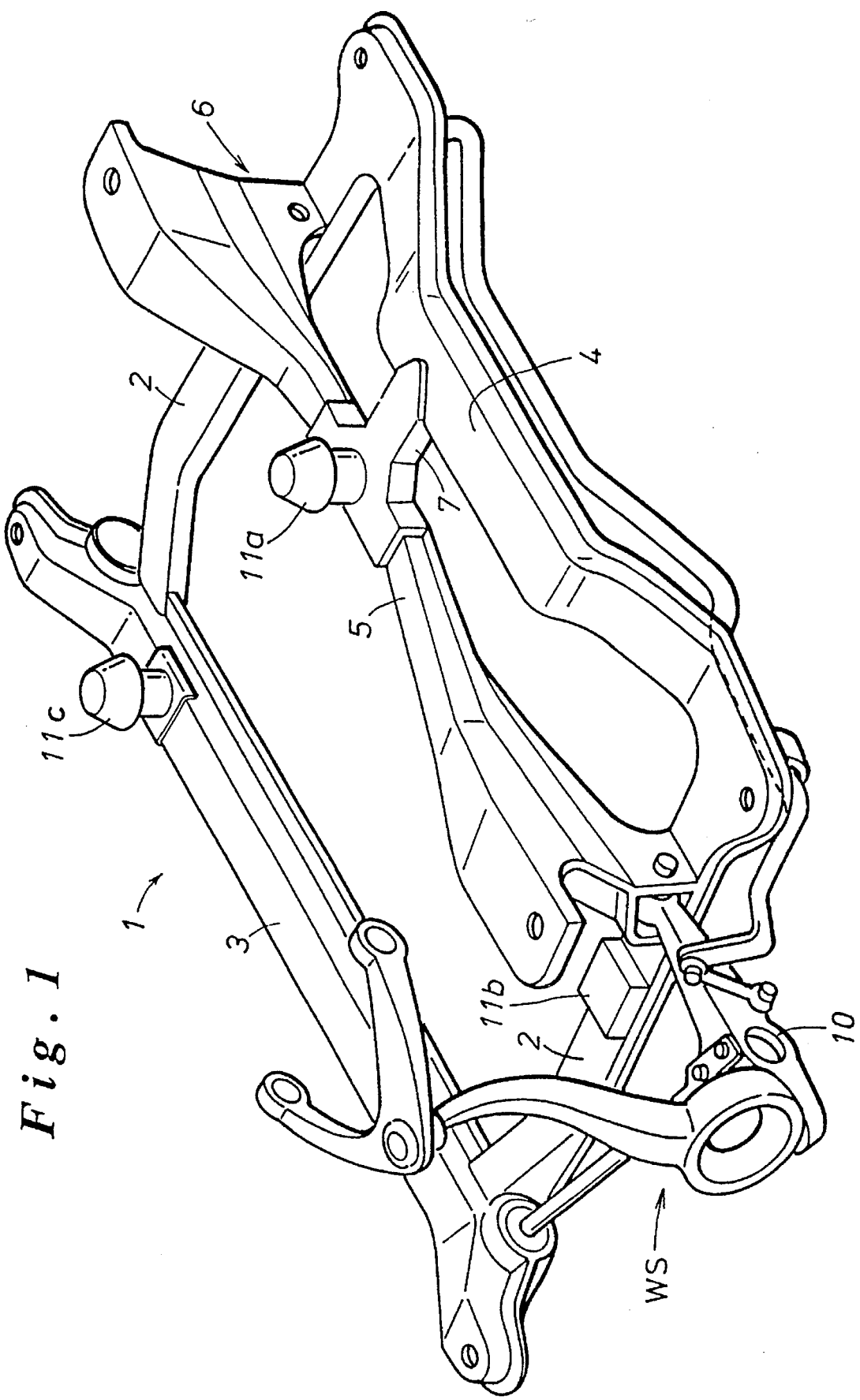
FIG. 1 is a perspective view showing an essential part of a vehicle subframe to which the preferred embodiment of the present invention is applied.
Figure 2:
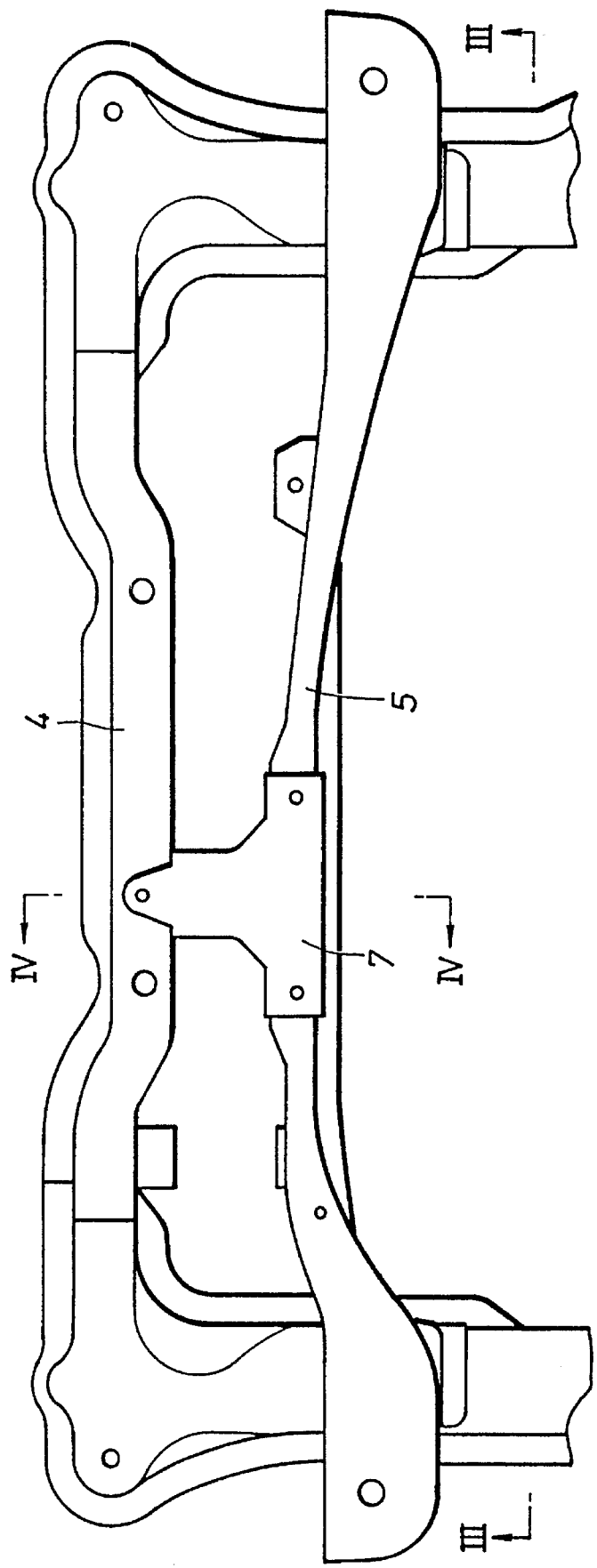
FIG. 2 is a plan view of a part of the subframe assembly of FIG. 1.

FIG. 1 shows a subframe 1 which is mounted on a vehicle body not shown in the drawing, and supports the inner ends of the lower arms 10 of a wheel suspension system WS, of which only the left half of the wheel suspension system WS is shown in the drawing. The subframe i comprises a pair of laterally spaced longitudinal members 2, which extend in parallel with each other along the longitudinal direction of the vehicle body, front and rear lateral members 3 and 4, which extend across and over the longitudinal end portions of the longitudinal members 2, and an intermediate lateral member 5, which extends across the longitudinal members 2 somewhat behind and above the mid section of the subframe 1. In this embodiment, the middle part of the rear lateral member 4 is somewhat more elevated than the longitudinal members 2. The intermediate lateral member 5 is provided with a Z-shaped cross section, and is connected to the longitudinal members 2 via substantially upright leg sections 6 so that the intermediate lateral member 5 and the elevated middle part of the rear lateral members 4 extend in a substantially same horizontal plane.

Figure 3:
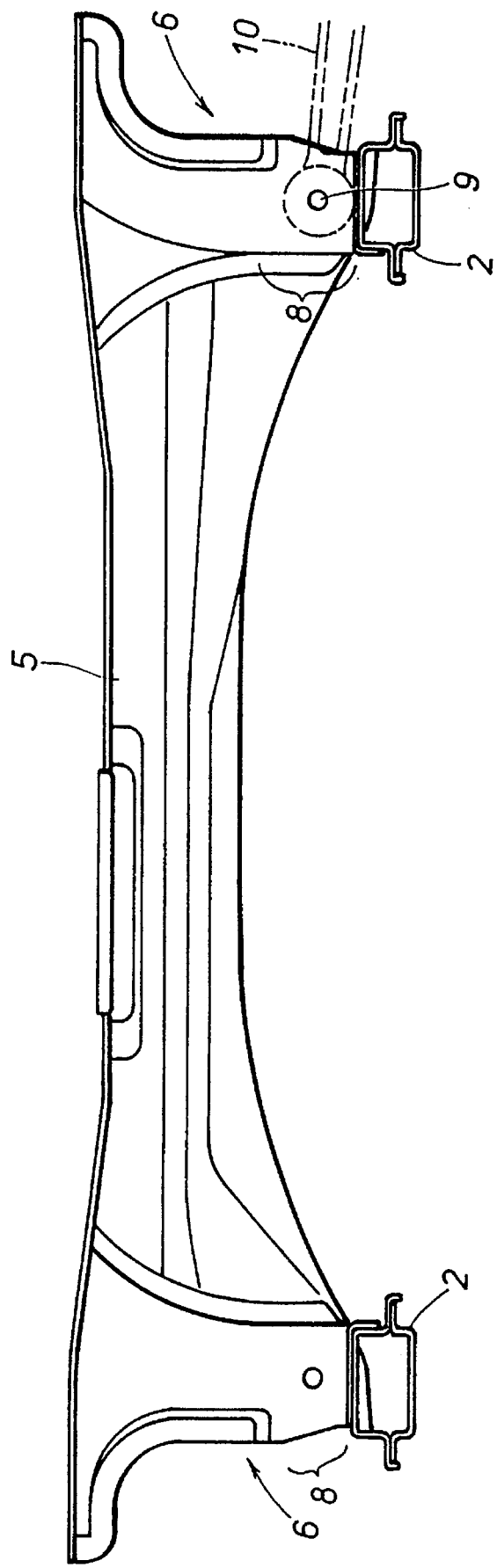
FIG. 3 is a sectional view taken along line III—III of FIG. 2.
Figure 4:
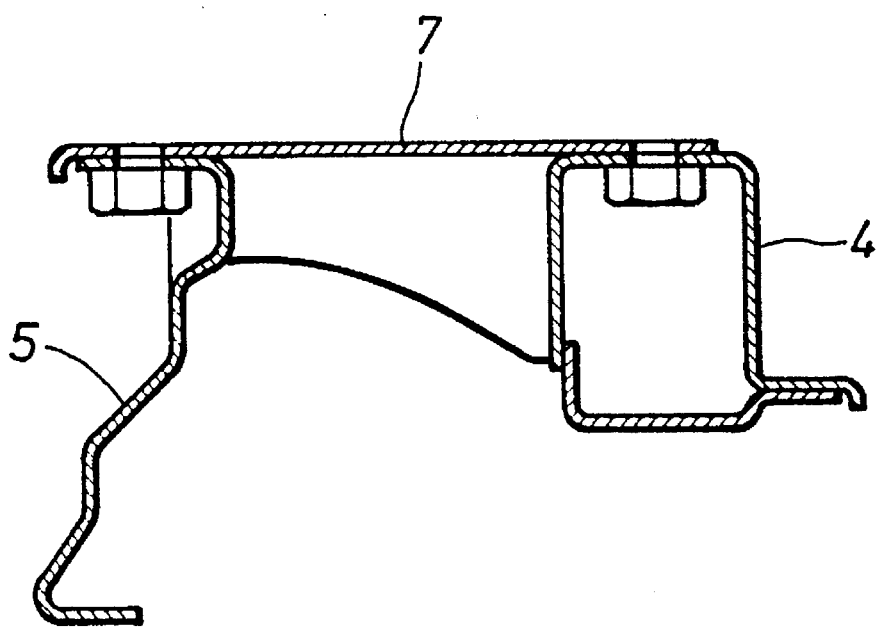
FIG. 4 is a sectional view taken along line IV—IV of FIG. 2.

The third lateral member 5, which is provided with a Z-shaped cross section, is relatively rigid against vertical loads, but is relatively deformable against longitudinal loads (Refer to FIGS. 3 and 4). Each of the leg sections 6, on the other hand, is provided with a rectangular closed cross section. In this embodiment, the intermediate lateral member 5 and the leg sections 6 are integrally formed by stamp forming a single metal sheet, and the leg sections 6 are then given a closed cross section by welding such as electric spot welding. The lower ends of the leg sections 6 are welded to the upper surfaces of the respective longitudinal members 2. Alternatively, the intermediate lateral member 5 and the leg sections 6 may consist of separate stamp formed members which are then joined together by welding.

A connecting member 7 extends across intermediate parts of the intermediate lateral member 5 and the rear lateral member 4. The connecting member 7 is provided with a generally planar main part which is attached to the intermediate and rear lateral members 4 and 5 by fastening means such as threaded bolts, and a pair of flanges 7a, which integrally depend from either side edge of the main part for reinforcement. The mounting holes provided in the lateral members 4 and 5 for attaching connecting members 4 and 5 consist of threaded holes formed for instance by welding nuts to them. The corresponding mounting holes provided in the connecting member 7 may consist of slots or relatively large circular holes so that slight dimensional adjustments can be made when the connecting member 7 is attached to the lateral members 4 and 5.

The engine, which is not shown in the drawings, is supported by three mounting points 11a, 11b, and 11c, provided in the upper surfaces of the connecting member 7, the front lateral member 3, and the rear lateral member 4, respectively. Because the mounting point 11a is supported by both the rear and the intermediate lateral members 4 and 5 by way of the connecting member 7, the rigidity required for the rear and the intermediate lateral members 4 and 5 can be reduced, and the weight of these members can be accordingly reduced. This is particularly significant when the mounting point 11 a is placed in a relatively middle part of each the lateral members 4 and 5. The third mounting point 11c is supported solely by the front lateral member 3, but as it is more offset from the middle part of the lateral member, the stress applied by the engine to the front lateral member 3 is not as great as that applied to the intermediate and rear lateral members 4 and 5. The second mounting point 11b is provided in the left longitudinal member 2.

Figure 5:
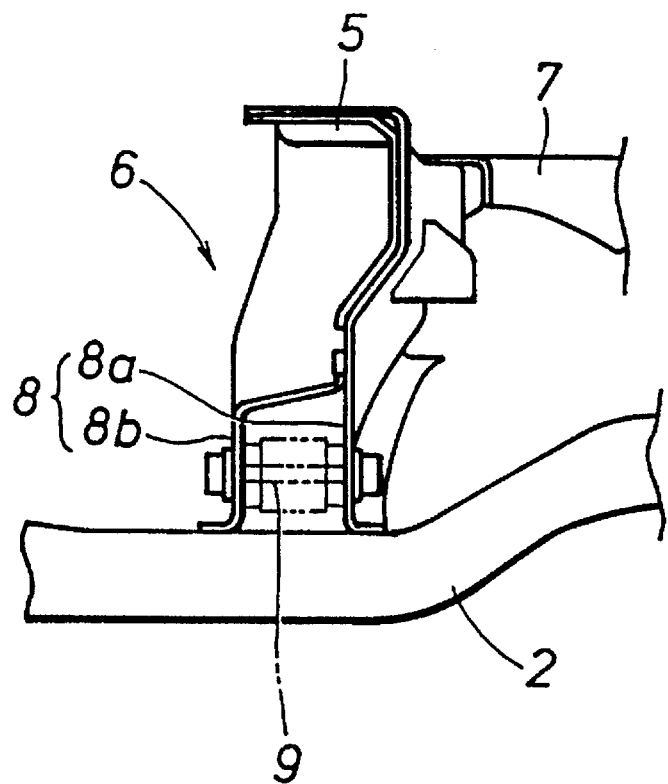
FIG. 5 is a fragmentary side view of the wheel suspension system mount assembly of FIG. 1.
Figure 6:
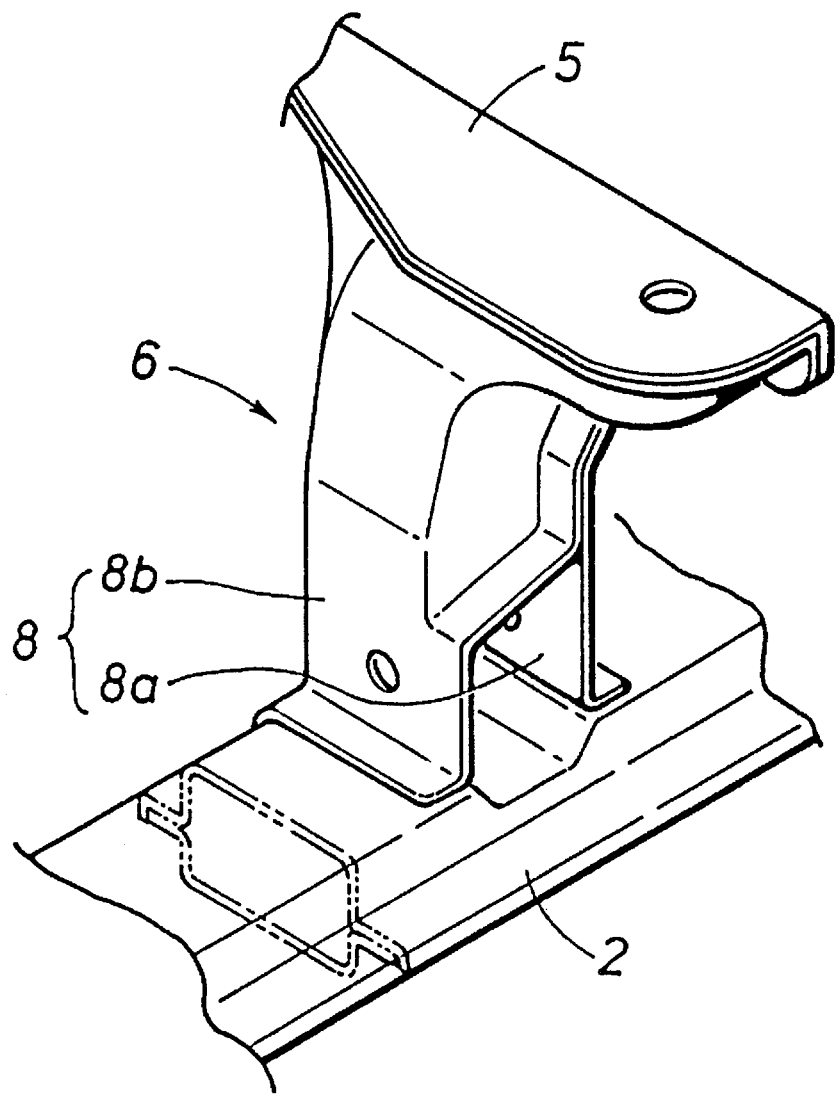
FIG. 6 is a fragmentary perspective view of the wheel suspension system mount assembly of FIG. 1.

As is best illustrated in FIGS. 5 and 6, a lower part of each of the leg sections 6 is provided with a bearing portion 8 which is defined by a pair of mutually opposing planar sections 8a and 8b. An inner end of each lower arm 10 of the wheel suspension system is pivotably supported by the corresponding beating portion 8 via a pin 9 and a resilient bush, typically made of rubber, which is not shown in the drawings. The two planar sections 8a and 8b are joined by another planar section at a side facing away from the lower arm 10. Thus, each of the leg sections 6 has a closed cross section at its upper portion, and is provided with a C-shaped cross section at its lower portion, but the lower end of each leg section 6 is welded to the upper surface of the corresponding longitudinal member 2, whereby the leg sections 6 are each provided with great mechanical rigidity and great mechanical strength over its entire length. This is desirable because it increases the rigidity of the subframe with respect to the loads, such as the vibrations and noises produced by the wheel, which are applied to the bearing portion 8, and the vibrations and noises are prevented from being transmitted to the passenger compartment.

Figure 7:
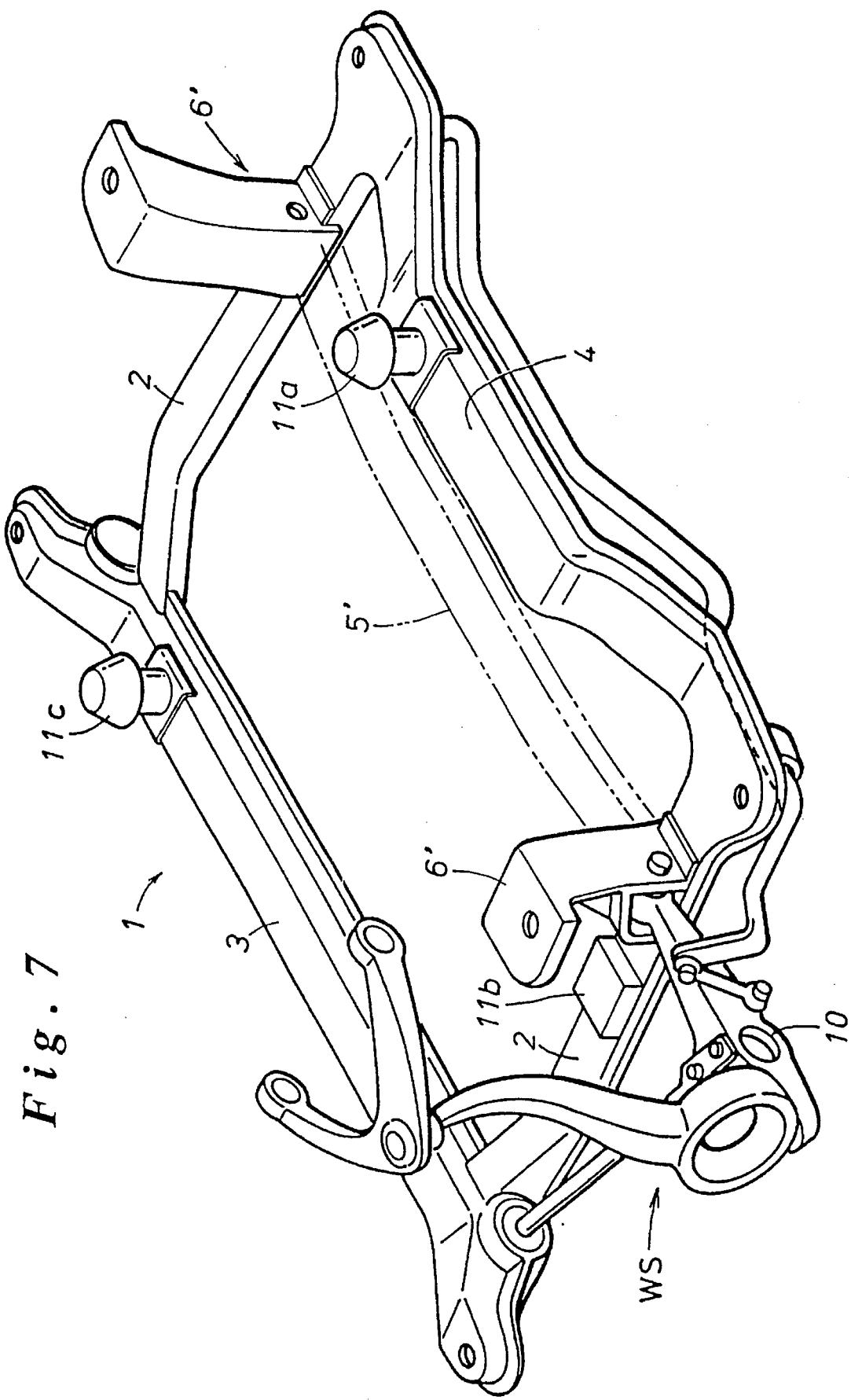
FIG. 7 is a view similar to FIG. 1 showing a second embodiment of the present invention.

In the above described embodiment, the bearing portions 8 were provided in the leg portions of the lateral member. However, according to the broad concept of the present invention, the bearing portions 8 may be provided in brackets 6' which are either welded to or integrally provided in the longitudinal members 2, for attaching the subframe to the vehicle body. For instance, in the embodiment illustrated in FIG. 7, the bearing portions 8 are provided in brackets 6' which are welded to the longitudinal members 2 for attaching the subframe to the vehicle body. Alternatively, the brackets 6' may be integrally provided in the longitudinal members 2, each by stamp forming a single metal sheet having a suitable shape. In either case, by forming the part of each bracket 6' above the bearing portion 8 as having a closed cross section, the rigidity of the bearing portions 8a can be particularly increased. If desired, a lateral member 5' may be extended between lower parts of the brackets 6' as indicated by the imaginary lines in FIG. 7. The lateral member 5' not only contributes to the overall reinforcement of the subframe, but also increase the rigidity of the points at which the lower arms 10 of the wheel suspension system WS am pivotably attached.

Thus, according to the present invention, because the lower arms of the wheel suspension system are each supported by a bracket which is attached to both the vehicle body and the subframe, the rigidity of the subframe with respect to the localized loads from the wheel suspension system can be ensured without adding any excessive weight to the subframe or complicating the fabrication process. This allows the vibrations and sounds, that may be otherwise transmitted from the lower arms of the wheel suspension system to the subframe, can be effectively insulated by the subframe, whereby the noise level in the passenger compartment can be reduced, and the ride comfort of the vehicle can be improved.

Although the present invention has been described in terms of preferred embodiments thereof, it is obvious to a person skilled in the art that various alterations and modifications am possible without departing from the scope of the present invention which is set forth in the appended claims.

What we claim is:

1. A wheel suspension system mount assembly, comprising:

a vehicle subframe including front and rear lateral members and left and right longitudinal members connected to each other in an approximately rectangular shape, said subframe being attached to a vehicle body, and said subframe supporting at least a part of a wheel suspension system; and a pair of brackets provided in said subframe on said left and right longitudinal members for attaching said subframe to said vehicle body;

each of said brackets being provided with a bearing portion located at a lower end of said brackets adjacent a position where said brackets are connected to said left and right longitudinal members, respectively, for pivotably supporting an inner end of a lower arm of said wheel suspension system.

2. The wheel suspension system mount assembly according to claim 1, wherein each of said brackets is provided with a closed cross section in a part thereof which extends between said bearing portion and said vehicle body.

3. The wheel suspension system mount assembly according to claim 2, wherein each of said brackets extends substantially upright from a corresponding longitudinal member extending along each side of said subframe.

4. The wheel suspension system mount assembly according to claim 3, wherein each of said bearing portions is defined by a pair of mutually opposing planar sections of a lower part of said bracket, said planar sections extending substantially laterally with respect to said vehicle body in a mutually spaced apart relationship.

5. The wheel suspension system mount assembly according to claim 4, wherein edges of said planar sections facing away from the corresponding lower arm are integrally joined together by a third planar section.

6. The wheel suspension system mount assembly according to claim 1, wherein lower parts of said brackets are joined with each other by a lateral member extending therebetween.

7. The wheel suspension system mount assembly according to claim 6, wherein said lateral member and said brackets are integrally formed substantially from a single metal sheet.

8. The wheel suspension system mount assembly according to claim 1, wherein lower parts of said brackets are joined with each other by a lateral member extending therebetween.

* * * * *